(12) United States Patent
Takanashi

(10) Patent No.: US 6,450,708 B1
(45) Date of Patent: Sep. 17, 2002

(54) BARRIER-ATTACHED CAMERA

(75) Inventor: Tatsuo Takanashi, Hachioji (JP)

(73) Assignee: Olympus Optical Co., Ltd. (JP)

( * ) Notice: Subject to any disclaimer, the term of this patent is extended or adjusted under 35 U.S.C. 154(b) by 68 days.

(21) Appl. No.: 09/690,154

(22) Filed: Oct. 17, 2000

(30) Foreign Application Priority Data

Oct. 18, 1999 (JP) .......................................... 11-295851
Feb. 22, 2000 (JP) ...................................... 2000-044899

(51) Int. Cl.[7] .......................... G03B 17/00; G03B 17/04
(52) U.S. Cl. ...................................... 396/448; 396/349
(58) Field of Search ............................... 396/348, 349, 396/448, 535

(56) References Cited

U.S. PATENT DOCUMENTS

| 5,822,634 A | 10/1998 | Morishita |
| 5,892,996 A | 4/1999 | Yokota |
| 5,950,028 A | 9/1999 | Ito |
| 6,302,598 B1 * | 10/2001 | Shiono et al. ............... 396/349 |
| 6,305,852 B1 * | 10/2001 | Suzuki et al. ............... 396/349 |

FOREIGN PATENT DOCUMENTS

| JP | 11-31539 | 5/1989 |
| JP | 2994523 | 10/1999 |

* cited by examiner

*Primary Examiner*—Alan A. Mathews
(74) *Attorney, Agent, or Firm*—Ostrolenk, Faber, Gerb & Soffen, LLP

(57) ABSTRACT

A barrier-attached camera of the present invention has a barrier movable to the open position and to the closed position, respectively, at which it opens and closes the front face of the lens barrel capable of moving forward and backward. When the barrier is moved to the closing direction, the lens barrel is contracted into the storage direction, at the time, the movement of the barrier to the closing direction is locked by the lock axis which is a lock member in the projected position. Even if in that state the lock axis is retained in the projected position, the lens barrel is smoothly contracted by the energizing spring developing the deflection. Once the operational force of the barrier is released, the lock axis is also drawn backward, and the barrier is capable of being driven and slid to the closed position. According to this barrier-attached camera, although the barrier is pressed and operated to the closing direction, the contracting motion of the lens barrel is not hindered.

20 Claims, 13 Drawing Sheets

BARRIER-ATTACHED CAMERA

This application claims benefit of Japanese Application No. Hei 11-295851 filed in Japan on Oct. 18, 1999 and Japanese Application No. 2000-44899 filed in Japan on Feb. 22, 2000, the contents of which are incorporated by this reference.

BACKGROUND OF THE INVENTION

1. Field of the Invention

The present invention relates to a barrier-attached camera having a barrier (lens barrier) movable to the open position at which photographing lens is exposed in the photographing position and to the closed position at which the foregoing photographing lens is covered in the storable position.

2. Description of the Related Art

As conventional barrier-attached camera, which is disclosed in Japanese Patent No. 3035911, is a camera employing a structure in which a barrier protecting front face of lens is locked at lens open position by an engaged locking pin to prevent an interference between a lens barrel and a barrier.

FIG. 22 is a transverse sectional view of the major portion surrounding lens barrel in a barrier locked state of the foregoing conventional barrier-attached camera. In FIG. 22, the lens barrel 101 is driven by motor M, and is located at photographable extending position. At that time, the barrier 104 is located in the open position, and is locked in the relevant open position by the engaged locking pin 110 in a projecting state. Therefore, when the foregoing lens barrel 101 is in a extending state, although the barrier 104 is pressed the direction P, it does not interfere with the lens barrel, so that it can prevent the lens barrel 101 from hindering the motion of moving forward and backward.

Consequently, when the lens barrel 101 is extended from the extending position into the storable position (collapsible barrel position), at its termination, it is moved backward by pressing the foregoing engaged locking pin 110 via the lens barrel flange position 101a, and the locked state of the barrier 104 is released. Once the locked state is released, the barrier 104 is movable to the closed position at which the barrier 104 covers the front face of the lens by sliding to D 10 direction.

However, in the case of a camera which is disclosed in the above described Japanese Patent No. 3035911, while contracting the lens barrel 101 into the storable position, if the barrier 104 is continued to be pressed to the direction P, since the engaged locking pin 110 is retained in a locked state, excess load acts on the contracting of lens barrel, and the power consumption of a motor is tremendous. Depending on the circumstances, abnormal force acts on the driving organization section and may result in destruction of it.

SUMMARY OF THE INVENTION

The present invention is performed to solve the problem of the above described discrepancy, and it is an objective of the present invention to provide a barrier-attached camera in which the contracting motion of lens barrel is not hindered by a barrier operation in a barrier-attached camera having a barrier movable to the open position and the closed position at which the lens barrel is opened and closed.

A barrier-attached camera of the present invention retains a camera body, a photographing lens, and has a lens barrel of photographing lens movable to optical axis direction of the above mentioned photographing lens, a barrier movable to an open position at which the above mentioned photographing lens is exposed and to an closed position at which the above mentioned lens is covered in a storable position, a locking member movable in optical axis direction of the above mentioned photographing lens for locking the above mentioned barrier so that the above mentioned barrier does not press nor contact the above mentioned lens barrel of photographing lens, a lock energizing member for energizing the above mentioned lock member to the direction of locking the above mentioned barrier, and a lock release energizing member to be provided on the above mentioned lens barrel of photographing lens, to move with the above mentioned lens barrel of photographing lens, and to push on the above mentioned lock member to the above mentioned storable position while the above mentioned lens barrel of photographing lens being moved to the above mentioned storable position, and when the above mentioned lens barrel of photographing lens is contracted into the storable position in a state where the above mentioned barrier is locked, the above mentioned lens barrel of photographing lens is smoothly contracted by the above mentioned lock release energizing member being deflected.

Other characteristics and benefit of the present invention will be apparent with the following description.

DETAILED DESCRIPTION OF THE PREFERRED EMBODIMENT

The embodiments of the present invention will be described below with reference to the drawings.

Figure 1:
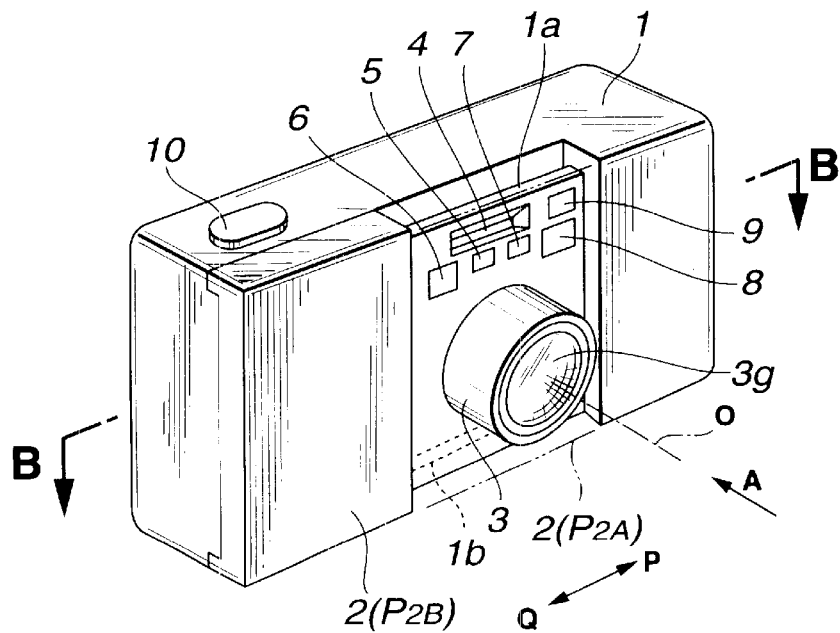
FIG. 1 is a perspective view showing barrier being in an open state of a barrier-attached camera of a first embodiment of the present invention.
Figure 2:
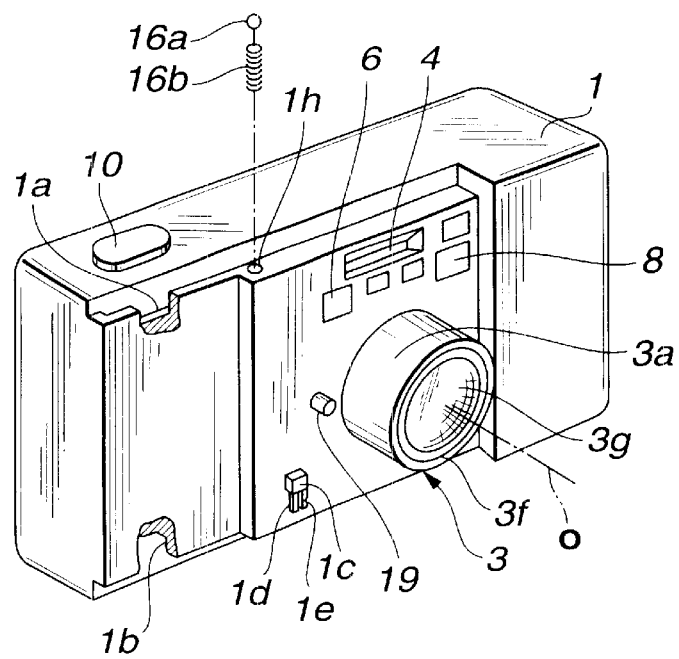
FIG. 2 is an exploded perspective view showing a state of a barrier being removed, when photographing, in a barrier-attached camera of the above mentioned first embodiment of the present invention.
Figure 3:
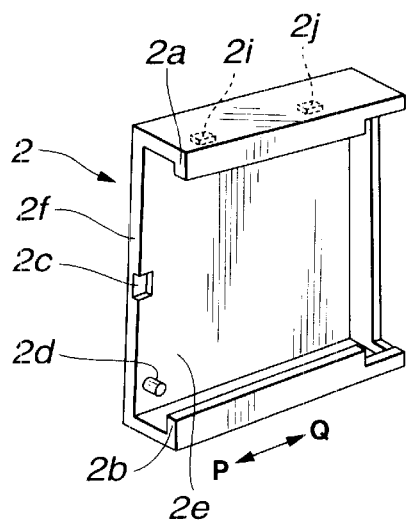
FIG. 3 is a perspective view showing a barrier mounted with a barrier-attached camera of the above mentioned first embodiment of the present invention from the opposite internal side of A direction of FIG. 1.

FIG. 1 is a perspective view of a lens barrier (hereinafter, referred to it as a barrier) of a barrier-attached camera being in an open state showing a first embodiment of the present invention. FIG. 2 is an exploded perspective view showing a state of a barrier being removed when the foregoing camera is photographing. FIG. 3 is a perspective view of a barrier mounted on the foregoing camera seen from the inside in a direction that is contrary to the direction A of FIG. 1.

A barrier-attached camera according to the present invention as shown in FIG. 1, provides the barrier 2 in the front face section of a camera body 1, which is movable to the closed position (P2A) where it covers the photographing lens at the storable position, and to the open position (P2B) where it exposes the photographing lens at the photographing position via a semi open position (P2C). Then, the lens barrel of the photographing lens (hereinafter, referred to it as lens barrel) 3 is driven to the storable position (collapsible lens barrel) in a non-photographing state, and to the photographing position in a photographable state, to-and-fro respectively, which is controllably linked to the operations of opening and closing of the above mentioned barrier 2. It should be noted that the above mentioned semi open position (P2C) is a locked position of the barrier 2, and a position from which the lens barrel is started to be stored (See FIG. 6 and 9).

Moreover, the above mentioned barrier has a trace moving between the above mentioned closed position and the above mentioned open position as described above, and the above mentioned photographing lens has a trace moving between the above mentioned photographing position and the storable position. Here, although the above mentioned moving traces themselves are crossed each other, when the above mentioned photographing lens is at the storable position, it is located out of the moving trace of the above mentioned barrier, and when the photographing lens is at the photographing position, it is located within the moving trace of the above mentioned barrier. Furthermore, in other words, when the above mentioned barrier is at the above mentioned open position, it is located out of the moving trace of the above mentioned photographing lens, and when the above mentioned barrier is at the closed position, it is located within the moving trace of the above mentioned photographing lens.

It should be noted that a moving direction of the above mentioned barrier 2 to the direction of the closed position is supposed as the direction P and a moving direction of the above mentioned barrier 2 to the direction of the open position is supposed as the direction Q in the following description.

In a camera of the above mentioned embodiment, the guide groove 1a, 1b for slidably supporting the barrier 2 are formed parallel to each other extending in right and left directions on upper section of the body and the lower section of the body in the front section of the camera body 1 which serves also as exterior housing body.

Moreover, in the center section of front face of the camera body 1, the lens barrel 3 is provided so as to freely move forward and backward in the direction of optical axis O, and the electronic flash window 4, the viewfinder window 5, the light intake window for focusing 6, the light projecting window for focusing 8, the light metering window 7, self timer display window 9 and the like are arranged over the lens barrel 3. When the barrier 2 is at the closed position P2A, a portion from the above mentioned lens barrel 3 in a storage state and the above mentioned the light intake window for focusing 6 to the self timer display window 9 is completely covered.

Moreover, on the upper face section of the camera body 1, the release button 10 for operating the release switch 10a (See FIG. 13) is provided and arranged.

Furthermore, as shown in FIG. 2, a head portion of the lock axis 19 which is a lock member capable of being appeared and concealed is located to the left side of the lens barrel 3 at the front face of the camera body 1, and to the lower portion of it, the barrier detection switch 1c having the contact fragment 1d, 1e is provided and arranged in order to detect the open or closed state of the barrier 2. In the front upper portion of the camera body 1, the small hole 1h is provided and arranged, and the spring for click 16b and the ball for click 16a giving a click stop action to the barrier 2 are fitted.

As shown in FIG. 3, on the barrier 2, the engagement guide portion 2a, 2b on upper and lower edge portions, the notch portion 2c and the protrusion 2d on interior wall face 2e near the side of the closing direction end face 2f, and two recessed portions for click 2i, 2j on the upper interior wall face are provided.

The above mentioned guide portions 2a, 2b are slidably fitted the foregoing guide grooves 1a, 1b of the camera body 1. The above mentioned protrusion 2d is a protrusion for pressing the contact fragment 1e of the barrier detection switch 1c provided and arranged on the camera body 1.

When the barrier 2 is in an open position P2B, the above mentioned protrusion 2d pushes on the above mentioned contact fragment 1e, and makes this contact fragment 1e contact with the contact fragment 1d, whereby the barrier detection switch 1c is made be an on-state. Moreover, when the barrier 2 achieves to the semi open position P2C from the open position P28, the contact fragment 1e is released and the barrier detection switch 1c is made be an off-state. It should be noted that despite the closed or open position of the barrier 2, the barrier detection switch 1c itself is always covered with the barrier 2, but not exposed.

Into the above mentioned recessed portions for click 2i, 2j, the above mentioned ball for click 16a fitted into the small hole 1h on the upper portion of the above mentioned camera body 1 is fallen, whereby making the user feel a clicking tactile, the barrier 2 is stopped at the predetermined position. Specifically, when in the recessed portion for click 2i, the ball 16a is fitted, the barrier 2 is click-maintained in the open position P2B, and when the ball 16a is fitted into the recessed portion for click 2j the barrier 2 is click-maintained at the closed position P2A, respectively.

The above mentioned notch portion 2c is a notch portion which can be pressed as far as it will be contacted with the head portion of the projecting lock axis 19 from the camera body 1. When the barrier 2 is moved from the open position P2B to the P direction in the case where the lens barrel 3 is at the photographing position, the above mentioned notch portion 2c is pressed as far as it will be contacted with the above mentioned on the side of the lock axis 19. At the semi open position P2C with which it is pressed as far as it will be contacted, its movement is hindered from moving to the P direction, i.e., that the head of the barrier 2 is pressed as far as it will be contacted with the peripheral of the lens barrel 3 is prevented.

Next, the lock organization related to the above lock axis 19 and the driving organization of the lens barrel 3 are described with reference to FIG. 4, 8 and the like. It should be noted that FIG. 4 is an exploded perspective view of the surroundings of the lock axis and the lens barrel, and FIG. 8 is across sectional plan view of a camera.

Figure 4:
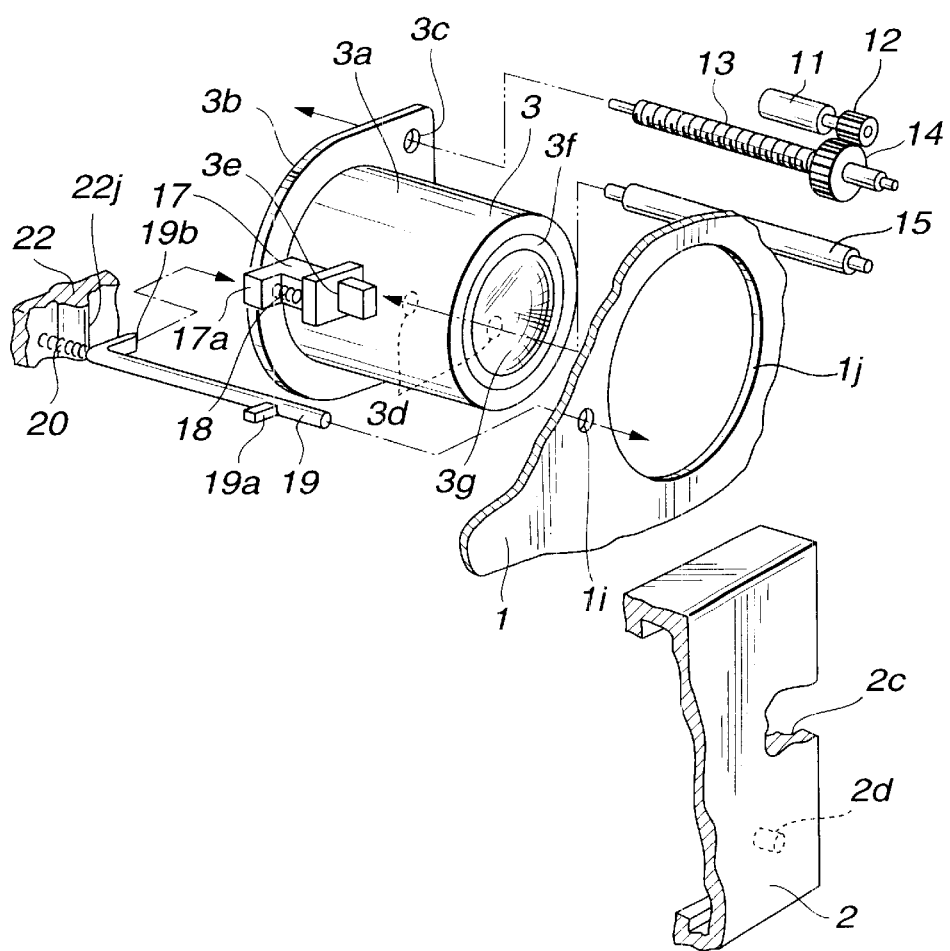
FIG. 4 is an exploded perspective view showing a lock member and surroundings of lens barrel of a barrier-attached camera of the above mentioned first embodiment a of the present invention.
Figure 8:
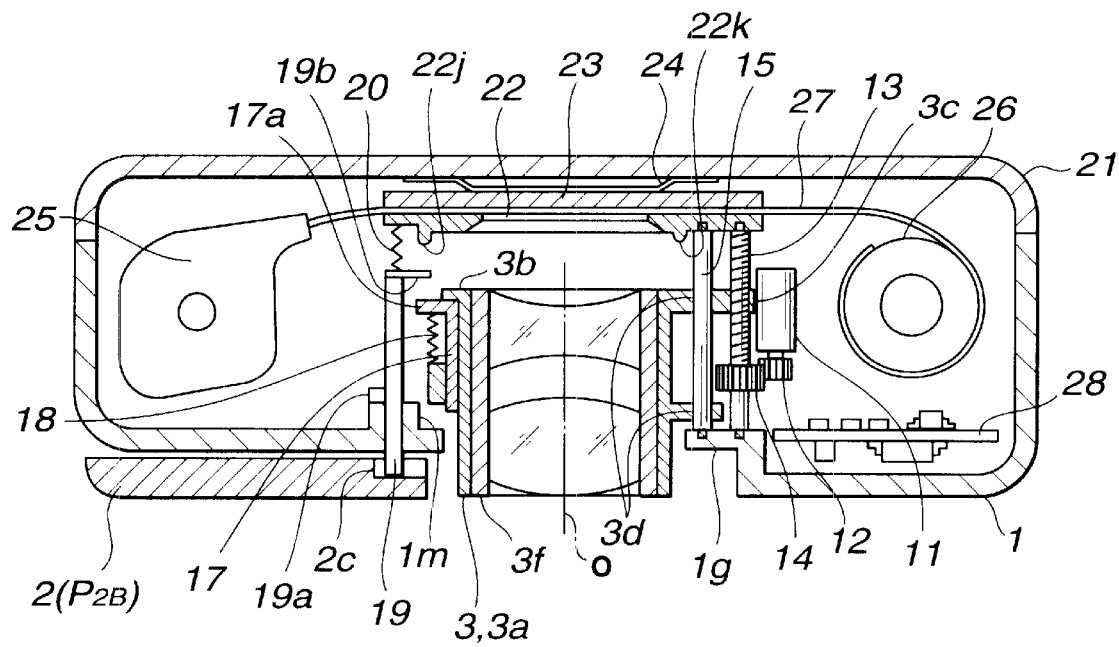
FIG. 8 is a B—B cross sectional view of FIG. 1 of a barrier of a barrier-attached camera of the above mentioned first embodiment of the present invention being in a state of open position and a lens barrel of a barrier-attached camera being in a state of photographing position.
Figure 10:
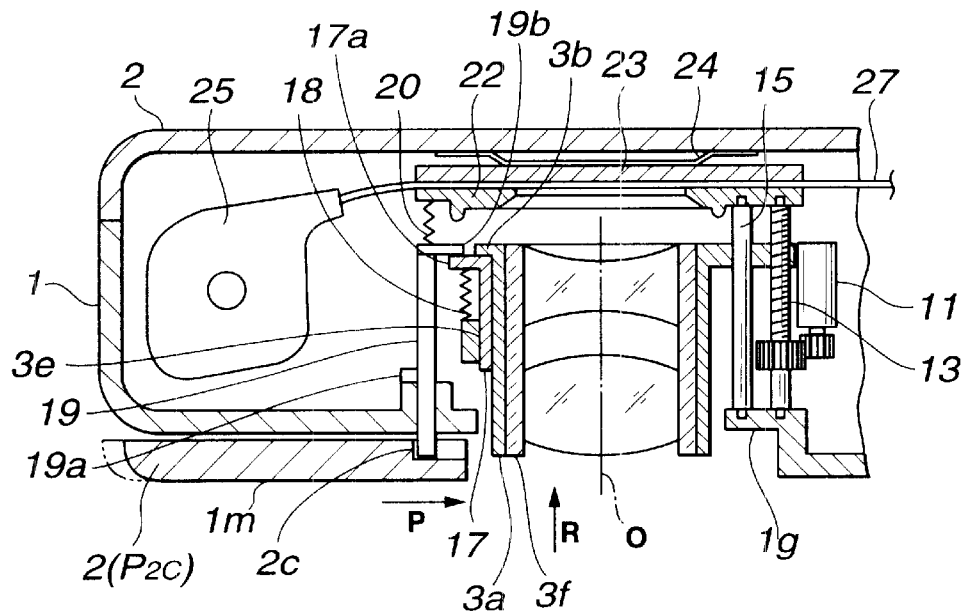
FIG. 10 is a B—B partial cross sectional plan view of a barrier of a barrier-attached camera of the above mentioned first embodiment of the present invention being in a semi open state and a lens barrel of a barrier-attached camera being on a way of contracting.
Figure 11:
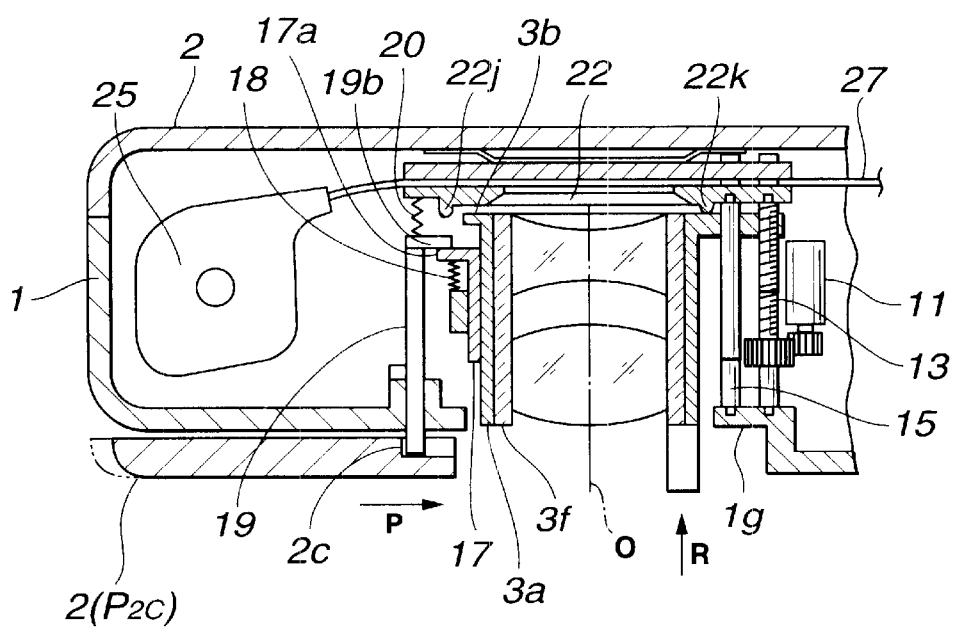
FIG. 11 is a B—B partial cross sectional plan view of a barrier of a barrier-attached camera of the above mentioned first embodiment of the present invention being in a semi open position, and a lens barrel of a barrier-attached camera having been contracted in a storable position.

As shown in FIGS. 4 and 8, the lock axis 19 is a lock member comprising an axial member, and having the stopper 19a near one end portion and the engagement portion 19b on another end portion. Then, it is slidably fitted into the supporting hole 1i of the camera body 1, and it is energized against the camera body 1 to the projecting direction (the front direction, the direction contrary to arrow A direction in FIG. 1, or the direction contrary to the arrow R direction of FIGS. 10, 11 is referred to) by the lock energizing spring (compression spring) 20 which is a lock energizing member. Here, the lock axis 19 is maintained in the supporting hole 1i of the camera body 1, but for example, it will be good if a unit within the camera such as a member forming a patrone chamber, which is not shown, can be substituted.

When the head portion of the above mentioned lock axis 19 is at a position projecting a little bit from the camera body 1, the stopper 19a is pressed as far as it will be contacted with an end face of the interior of the supporting hole 1i, the protrusion position is positioned. Moreover, as for the above mentioned lock axis 19, when the head portion of the lock axis 19 moves backward to the surface of the camera body 1, it is pressed as far as it will be contacted with the protrusion 22j of the aperture member 22.

The lens barrel 3 is consisted of the moving zoom frame 3f maintaining mainly the photographing lens 3g, the moving frame 3a maintaining the moving zoom frame 3f in a manner being capable of going to-and-from, the pressure plate 17 which is fitted into the guide hole 3e of peripheral portion of the moving frame 3a and is a pressure member slidably supported along the optical axis, and the pressure energizing spring (compression spring) 18 which is a lock release energizing member for energizing the above mentioned pressure plate 17 to the rear direction (the direction of arrow A in FIG. 1). It should be noted that it is supposed that the energizing force of the above mentioned pressure energizing spring 18 is larger than that of the lock energizing spring 20 for making the lock axis 19 be projected.

The above mentioned lens barrel 3 is fitted into the opening portion 1j of the camera body 1, and slidably supported along the guide axis 15 supported by the camera body 1. Then, it is driven forward and backward by feed screw 13 which is a driving means parallel to the above mentioned guide axis 15. The flange portion 3b of the lens barrel 3 being in a state where it is contracted into the storable position within the camera body 1, is pressed as far as it will be contacted with the protrusion 22k of the aperture member 22 fixed on the camera body 1. It should be noted that the pressure plate 23 and the pressure spring 24 are provided and arranged between the rear cover 21 in the rear of the aperture member 22 and the aperture member 22.

It should be noted that the feed screw 13 is fitted and engaged into the screw hole 3e provided at the flange portion 3b of the moving frame 3a, and rotatably supported between the aperture member 22 and the camera body 1, and has the gear 14 engaging with the pinion 12 of the driving motor 11, which is a driving means, at one end. Moreover, the guide axis 15 is supported between the aperture member 22 and the camera body 1 and slidably fitted into the guide hole 3d of the moving frame 3a.

The above mentioned pressure plate 17 has the protrusion 17a which is capable of engaging with the engagement portion 19b of the lock axis 19, when it is not engaged with the lock axis 19, it is in a state where it is pressed as far as it will be contacted with the flange portion 3b of the moving frame 3a by the energizing force of the pressure energizing spring 18.

Next, the motion of moving forward and backward of the lens barrel accompanied with the closing and opening of the barrier in a barrier-attached camera of the first embodiment of the present invention constituted as described above will be described with reference to FIGS. 5 through 12. It should be noted that FIGS. 5 through 17 are front elevations showing the closed and open state of a barrier seen from the direction A of FIG. 1, FIG. 5 shows a state of barrier being open, FIG. 6 shows a state of barrier being semi open, and FIG. 7 shows a state of barrier being closed.

Figure 9:
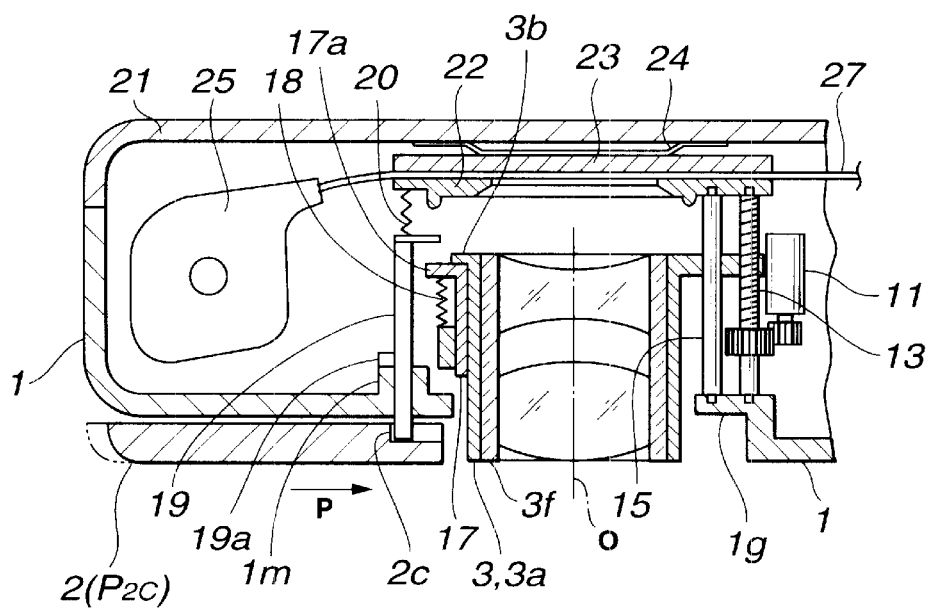
FIG. 9 is a B—B cross sectional view of FIG. 1 of a barrier of a barrier-attached camera of the above mentioned first embodiment of the present invention being in a semi open position and a lens barrel of a barrier-attached camera being in a state of photographing position.
Figure 12:
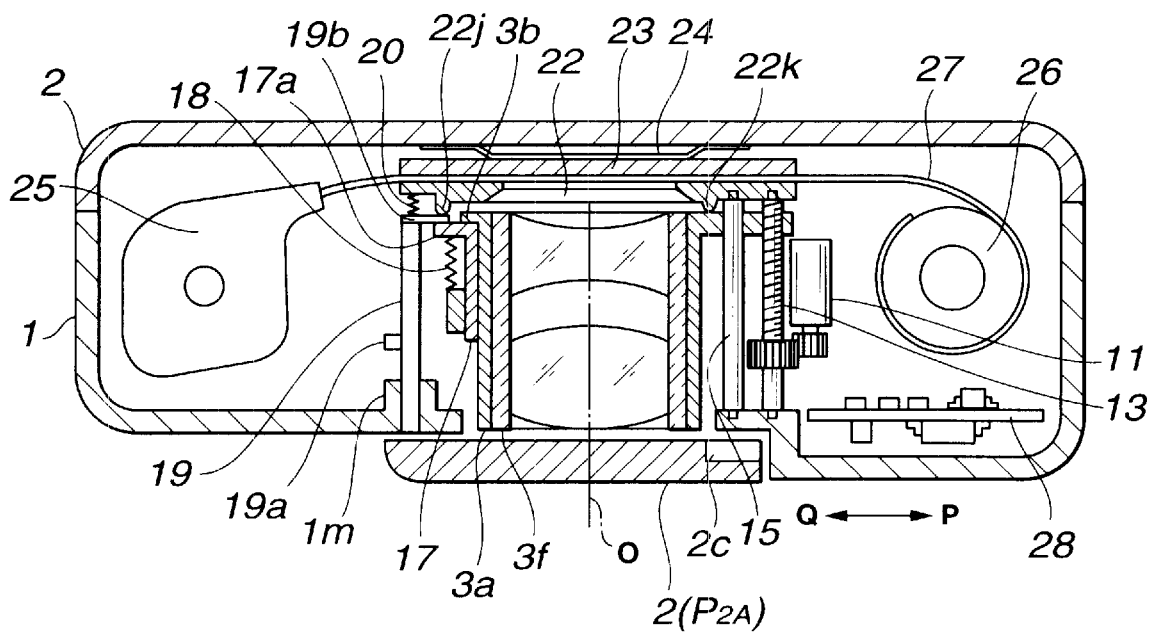
FIG. 12 is a B—B cross sectional view of a barrier of a barrier-attached camera of the above mentioned first embodiment of the present invention being in a closed position and a lens barrel of a barrier-attached camera being in a state located in a storable position.

Moreover, FIGS. 8 through 12 are B—B sectional views or partial sectional views of each motion state of the barrier and lens barrel, FIG. 8 shows that the barrier is in an open position and the lens barrel is in a photographing position, FIG. 9 shows that the barrier is in a semi open position and lens barrel is in a photographing position, FIG. 10 shows that the barrier is in a semi open position and the lens barrel is on a way of being contracted toward fed into the storable position, FIG. 11 is in a semi open position and the lens barrel is in a state where it is contracted into the storable position, and FIG. 12 shows that the barrier is in a closed position and the lens barrel is contracted into the storable position.

Figure 5:
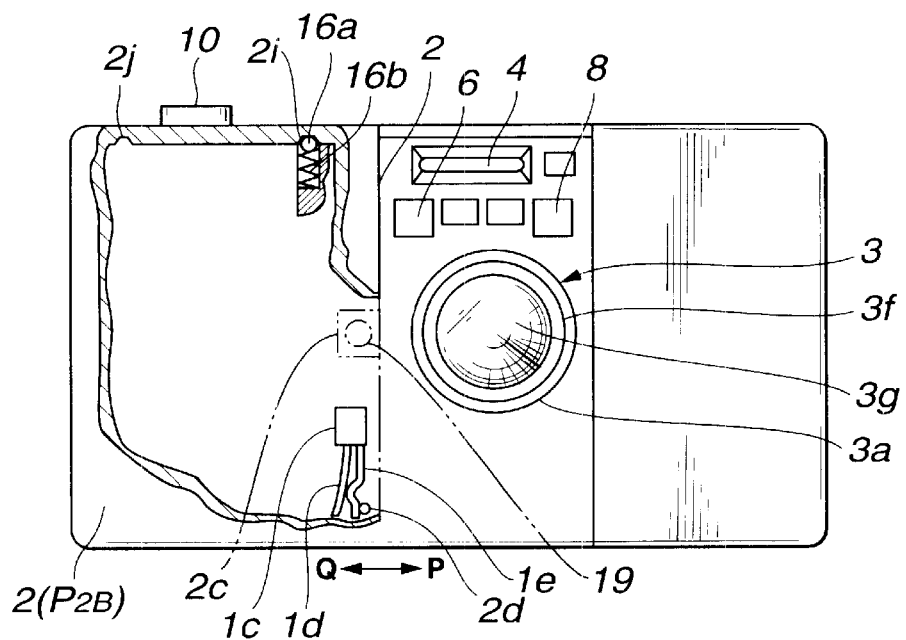
FIG. 5 is a front view of a barrier open state seen from the direction A of FIG. 1 of a barrier-attached camera of the above mentioned first embodiment of the present invention.
Figure 6:
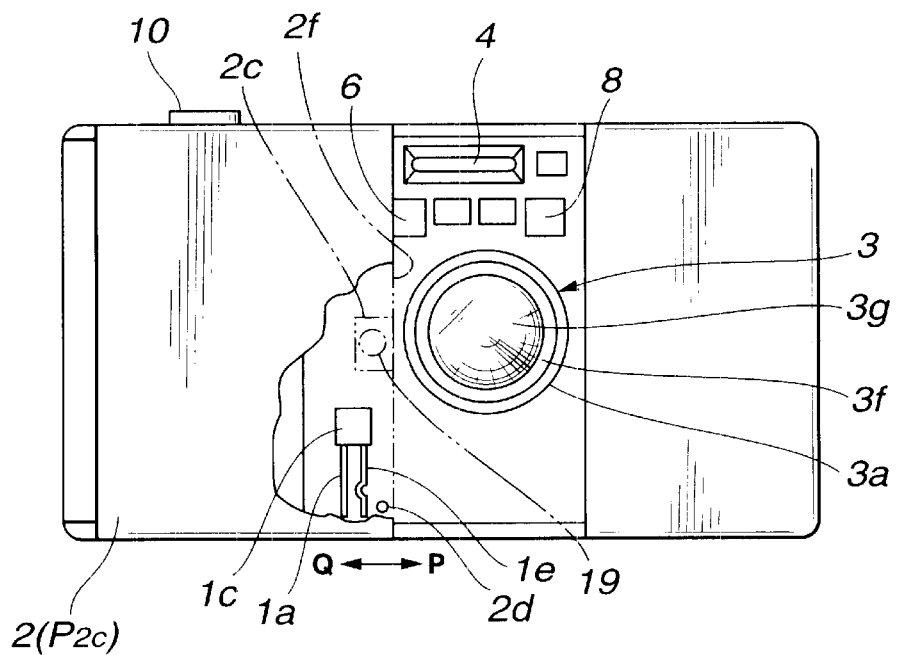
FIG. 6 is a front view of a barrier semi open state seen from the direction A of FIG. 1 of a barrier-attached camera of the above mentioned first embodiment of the present invention.
Figure 7:
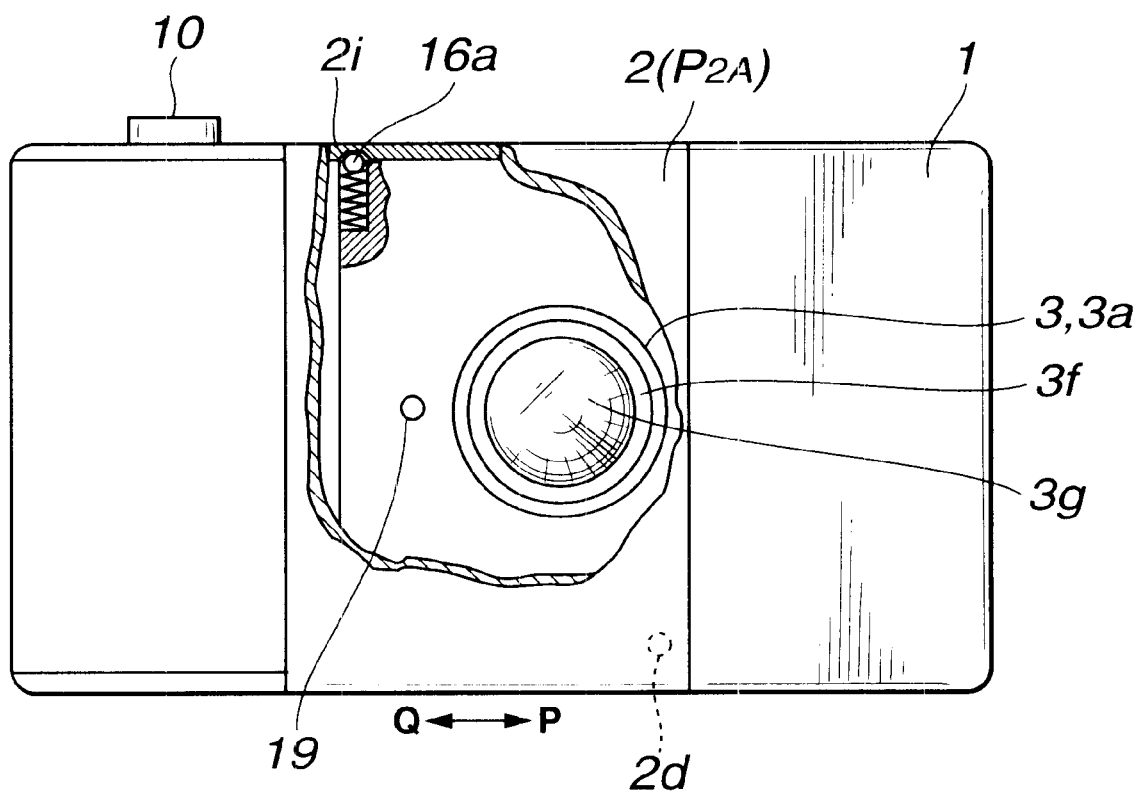
FIG. 7 is a front view of a barrier closed state seen from The direction A of FIG. 1 of a barrier-attached camera of the above mentioned first embodiment of the present invention.
Figure 13:
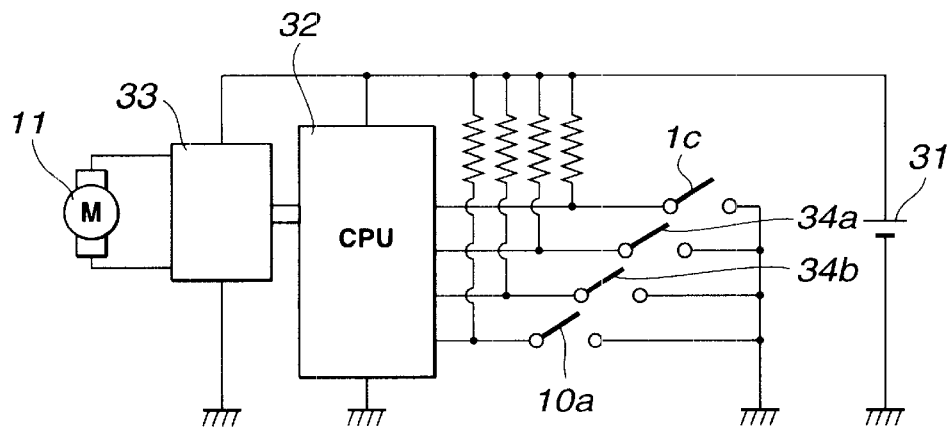
FIG. 13 are a lens barrel control section of a barrier camera of a barrier-attached camera of the above mentioned first embodiment of the present invention and a major electric control circuit of surroundings of respective detection switch.

In the case where the lens barrel shown in FIGS. 5 and 8 is in a photographing position, when the barrier 2 is slightly slid to the direction P from the open position P2B to the semi open position P2C of FIGS. 6 and 9, the barrier detection switch 1c is released from the pressure force of the barrier protrusion 2d by its slight movement, and its off-signal is outputted into the CPU 32 (See FIG. 13). The contracting motion to the storable position of the lens barrel 3 is started by its output.

At that time, the notch portion 2c of the barrier 2 is pressed as far as it is contacted with the head portion of the lock axis 19 and the barrier 2 is locked in the above mentioned semi open position P2C (movement restriction in the direction P), the barrier 2 cannot be moved to the direction P any more. Therefore, the head face 2f of the barrier 2 is not pressed as far as it is contacted with the peripheral of the lens barrel 3, so that the lens barrel 3 is protected. At the same time, excess loads are not acted on the driving motor 11, so that the normal contracting state can be obtained.

Subsequently, the lens barrel 3 of FIG. 10 is contracted into the direction R of the direction of the storable position, and when the lens barrel 3 is achieved to the point near the storable position, the engagement portion 19b of the lock axis 19 and the protrusion 17a of the pressure plate 17 are moved into as far as they are contacted with each other.

If the barrier 2 is pressed the direction P at the time of the contact described above, a friction maintenance force of direction of right angle to the lock axis 19 acts to the lock axis 19 by the notch portion 2c of the barrier 2 and the lock axis 19 being pressed as far as they are contacted with each other, it is maintained in a projected position. Therefore, accompanied with the lens barrel 3 being contracted into the direction R, the pressure plate 17 is moved relatively with the moving frame 3a to the contrary direction to the direction R by gradual deflection of the pressure energizing spring 18 by the engagement portion 19b of the lock axis 19. Specifically, the lock axis 19 and the pressure plate 17 are integrated into one-piece in the camera space, their amount of the movement is zero, and only the lens barrel is moved.

As described above, the lens barrel 3 can be smoothly contracted into the storable position without the lock axis 19 maintained with the above mentioned friction maintenance force being forced to move to the direction R by the pressure energizing spring 18 indirectly pressing the engagement portion 19b of the lock axis 19 and developing deflection of the pressure energizing spring 18 via the protrusion 17a of the pressure plate 17.

Subsequently, once the operational force of the barrier 2 to the direction P is released, maintenance force by the friction of the lock axis 19 is also released, the lock axis is moved backward from the projected position to the dugout position not projecting from the camera body 1 by pressing the lock energizing spring 20 via the energizing force of the pressure energizing spring 18. In this state, the barrier 2 is released from a locked state of the lock axis 19, can be moved to the closed position P2A (See FIG. 12).

In order that the above mentioned barrier 2 is opened and the lens barrel 3 is made in a photographing state, the barrier 2 being in the closed position as shown in FIG. 7 and 12 is operated to be slid to the direction Q. When the barrier 2 passes over the semi open position P2C and achieves to the open position P2B, the barrier detection switch 1c is switched on-state. The CPU 32 (See FIG. 13) controls the driving motor 11 based on its on-signal and the lens barrel 3 is extended to into the photographing position as shown in FIGS. 5 and 8.

In the above described state, since the lock axis 19 is released from the pressure state by the pressure plate 17, again, the head portion is moved to the projected position where the barrier can be locked and the head portion is projected from the camera body 1.

In the achievement of the present invention, the pressure plate 17 is not always necessary, and it may be constituted that the pressure energizing spring 18 is directly pressed as far as it will be contacted with the engagement portion 19b of the lock axis 19 so as to press it.

Here, the constitution of the lens barrel control section of the camera as the driving control means of the present embodiment and the major electric control circuits of the surroundings of each detection switch section will be described with reference to the diagram of electric circuit of FIG. 13.

A camera of the present embodiment of the present invention is driven by the electric cell 31 which is the power source. The CPU 32 is a control means accounts for the entire control over the present camera. The driver for driving motor 33 is partially accounting for as a driving means, is controlled by the CPU 32, drives the driving motor 11, and drives the lens barrel 3 to be moved forward and backward.

Moreover, the above mentioned CPU 32 fetches output signals of the switch the storable position 34a incorporated within the camera body and the switch for detecting the photographing preparation position (photographing position) 34b to itself, and detects the state of moving forward and backward of the lens barrel 3. Moreover, an output signal of the barrier detection switch 1c is inputted to the CPU 32 and that the barrier 2 is released is detected. Furthermore, an output signal of the release switch 10a operated by the release button 10 is fetched into the CPU 32 and sequence for the photographing is started.

Next, the photographing process control motion including the above mentioned closing and opening motion of the barrier will be described with reference to the flowchart of FIG. 13. It should be noted that FIG. 13 is a general flowchart of photographing process including control motion of the lens barrel 3 accompanied with the opening and closing of the barrier in a camera of the present embodiment of the present invention.

Figure 14:
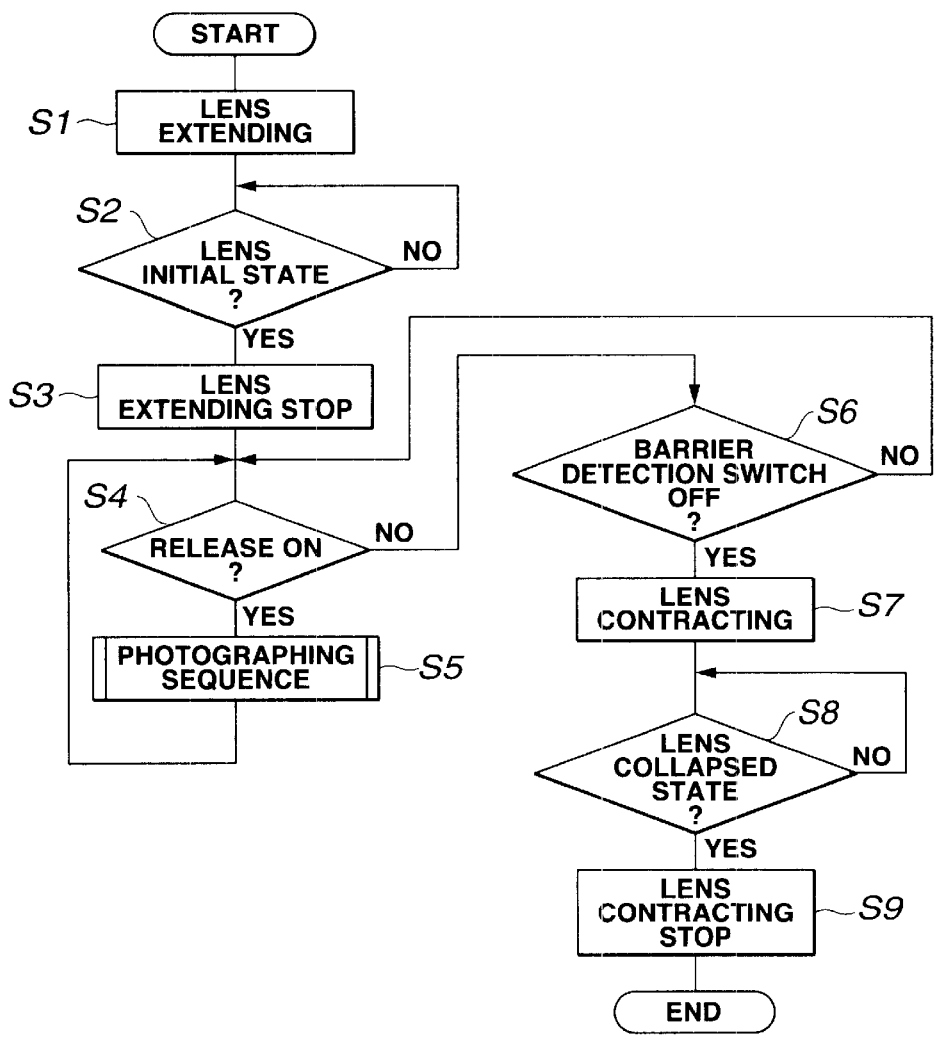
FIG. 14 is a general flow chart of photographing process including a controlling motion of lens barrel by a barrier opening and closing in a barrier-attached camera of the above mentioned first embodiment of the present invention.

When the barrier 2 is moved from the closed state of the barrier 2 to the open position P2B by manual operation, the barrier detection switch 1c is switched on. Specifically, the contact fragment 1d and 1e are contacted with each other and the photographing process performed by the CPU 32 as shown in FIG. 14 is started.

In the step S1, the CPU 32 transmits a driving signal to the driver for driving motor 33, and the lens barrel 3 collapsed within the camera by the driving motor 11 is extended to the direction of the photographing preparation position (photographing position). In the step S2, the CPU 32 checks whether or not the lens barrel 3 is achieved to the photographing preparation position (lens initial position), for example, the zoom wide end position. When it is detected by the photographing preparation position detection switch 34b, that the lens barrel 3 is achieved to the photographing preparation position, in the step S3, the driving motor 11 is switched off, and the extending of the lens barrel 3 is stopped.

Subsequently, proceeding to the step S4, the release switch 10a checks whether or not the release button 10 is operated. When the relevant switch 10a is on, proceeding to the step S5, the photographing sequence process performed by the CPU 32 is carried out.

Moreover, when it is detected that the release switch 10a is off via the check of the aforementioned step 4, jumping to the step S6, it is checked whether the barrier detection switch 1c of the barrier 2 is on or of. When that the barrier detection switch 1c is off is detected, specifically, in the case where the barrier 2 is moved to the closed position by manual operation, proceeding to the step S7, the lens barrel 3 is driven to the contracting direction (the direction R).

Then, in the step S8, the CPU 32 checks whether or not the lens barrel 3 is contracted into the storable position by an output signal of the storable position detection switch 34a. When it is determined that the lens barrel 3 is achieved to the storable position, proceeding to the step S9, the driving of the lens barrel 3 is stopped and the present routine is completed.

Up to this point, according to the described barrier-attached camera of the first embodiment of the present invention, while the motion of the lens barrel 3 is contracted into the storable position, if the barrier 2 is press operated in a retained manner to the closing direction, the above mentioned barrier 2 is locked with the lock axis 19 which is a lock member located in a projected position, that it is pressed as far as it will strike the lens barrel 3 is prevented. If the lock axis 19 is not pressed in the direction P (the closing direction) while the contracting motion of the lens barrel, naturally, this lock axis 19 is drawn backward to the drawing backward position by the pressure plate 17.

However, in the case where the lock axis 19 is maintained in a pressed state to the direction P by the barrier 2, the lock axis 19 is not drawn backward, and the pressure energizing spring 18 itself develops deflection. Therefore, while the contracting of the lens barrel 3, only the load is increased by the portion of deflection of the above mentioned pressure energizing spring 18, abnormally excess load driving state is not made, and the states such as the state of the driving motor 11 being heavily loaded, the state of the power being significantly consumed or the like can be avoided.

Next, a barrier-attached camera of the second embodiment of the present invention is described bellow.

Figure 15:
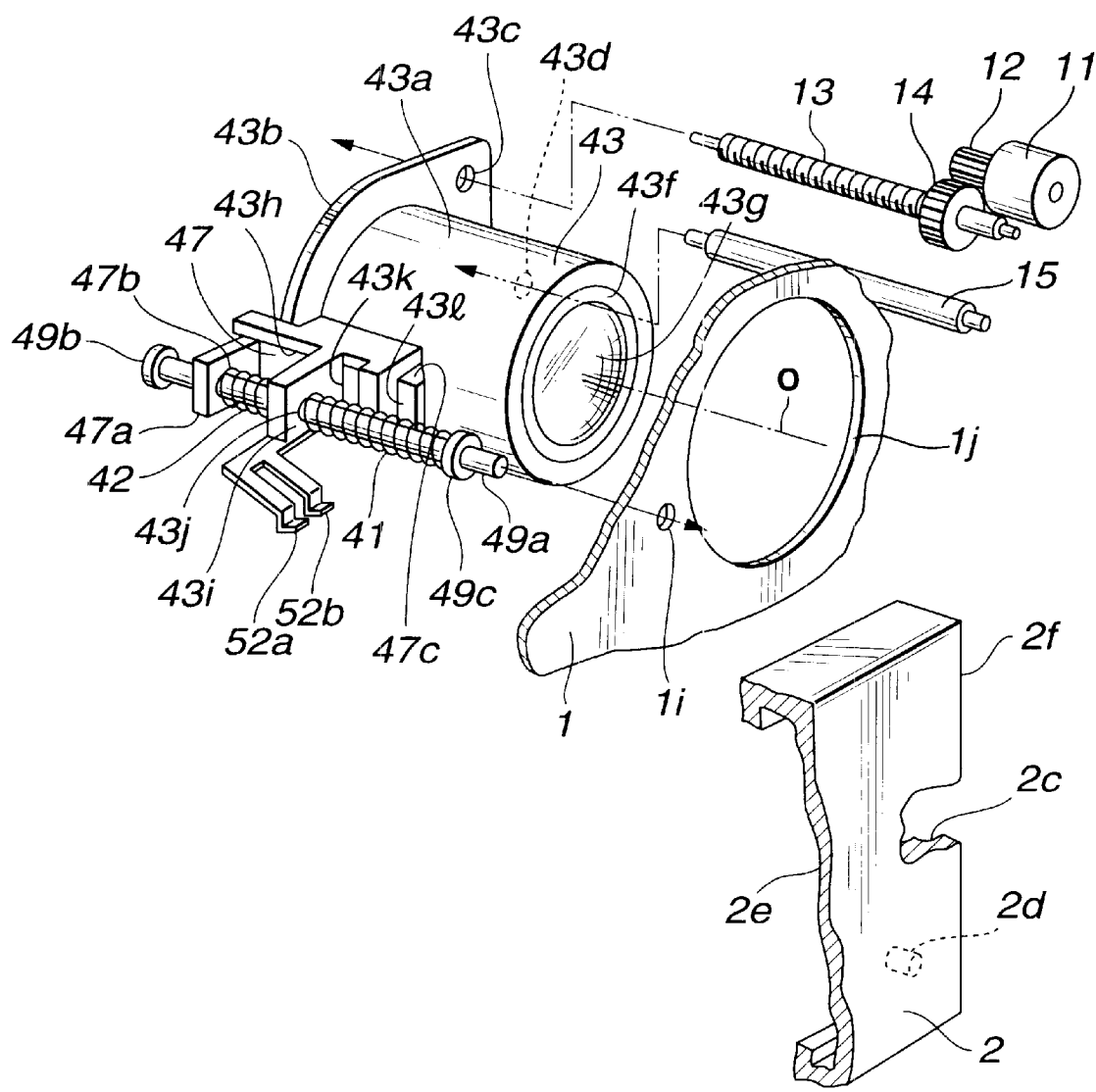
FIG. 15 is an exploded perspective view showing surroundings of a lock axis and a lens barrel of a barrier-attached camera of the second embodiment of the present invention.
Figure 16:
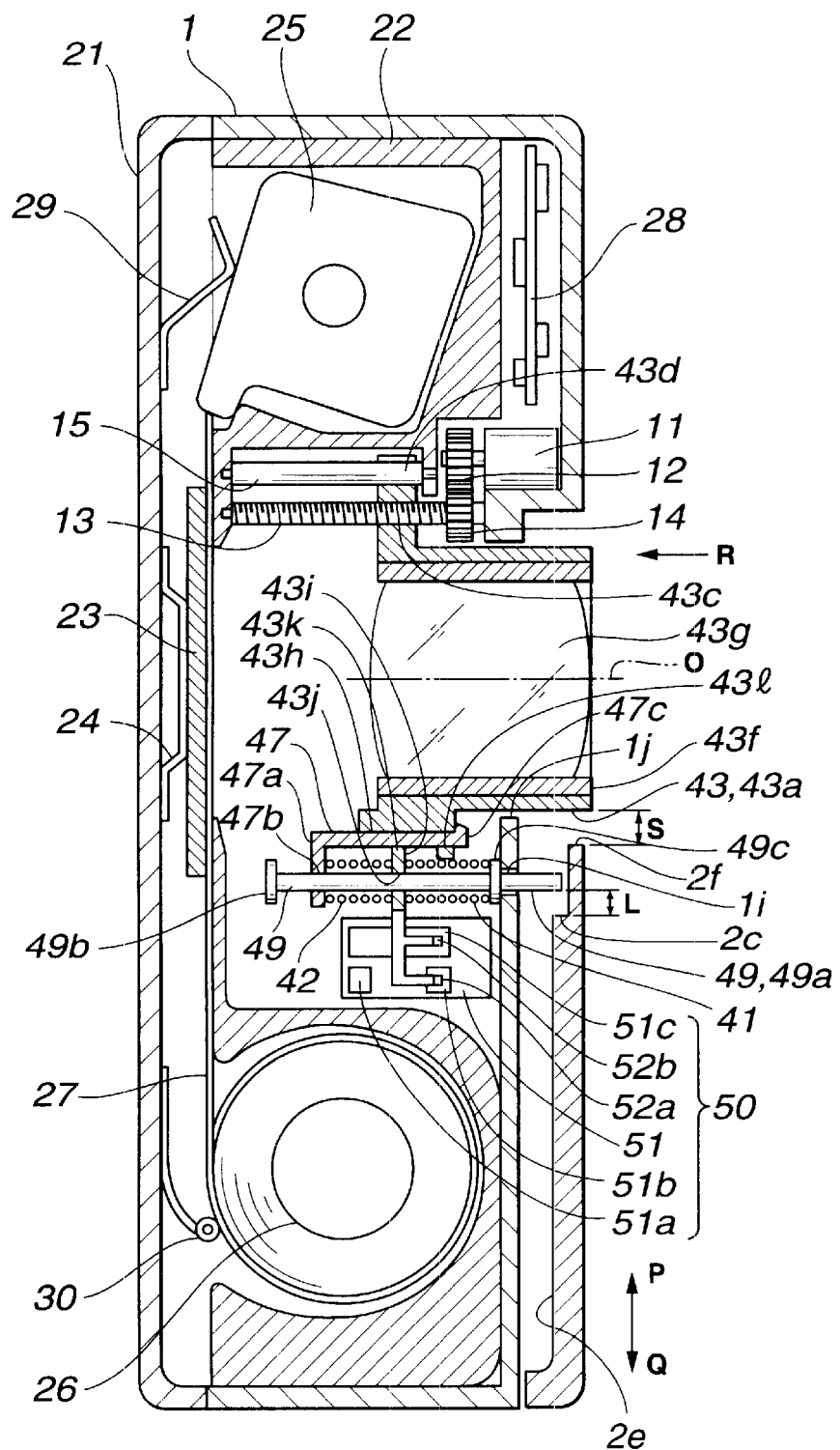
FIG. 16 is a cross sectional view of a barrier of a barrier-attached camera of the above second embodiment of the present invention being in an open state and in a photographing state.

FIG. 15 is an exploded perspective view of surroundings of a lock axis which is a lock member of the above mentioned barrier-attached camera and a photographing lens barrel (hereinafter, referred as lens barrel). FIG. 16 is a cross sectional view of the above mentioned barrier-attached camera, showing that the lens-barrier (hereinafter, referred as barrier) is in an open state and the lens barrel is in a photographing position. It should be noted that supposing the movement direction of the barrier to the direction of the closed position is the direction P and the movement direction of it to the direction of the open position is the direction Q.

Since the constitution including the exterior housing such as a barrier of a barrier-attached camera of the present embodiment of the present invention or the driving organization of moving forward and backward have the same constitution with that of the barrier-attached camera of the above mentioned first embodiment of the present invention, the same constituting member is noted as the same reference numerals and letters. Then, similarly in the present camera, on the front face of the camera body 1, the barrier 2 which is movable to the closed position (P2A) covering the photographing lens in the storable position and to the open position (P2B) exposing the photographing lens in the photographing position via the semi open position (P2C) is provided and arranged, the lens barrel 43 is moved forward and backward to the storable position (the collapsible position) in a non-photographing state and to the photographing position (the photographable state) cooperating with the opening and closing motion of the barrier 2.

Similarly in the first embodiment of the present invention, the above mentioned barrier 2 is provided with the notch portion 2c of the closing direction end portion and the protrusion 2d as well as the engagement guide portion for sliding and the recessed portion for click.

On the side of the camera body 1, similarly on that of the first embodiment of the present invention the supporting hole 1i on the left side of the lens barrel 43 as well as the guide groove for slidably supporting the barrier 2 is provided and arranged, in the supporting hole 1i, the head portion 49a of the lock axis 49 is fitted in a manner capable of being appeared or concealed. In the lower section of it, the barrier detection switch 1c having the contact fragment 1d, 1e for detecting the open or closed state of the barrier 2 is provided and arranged. Then, when the barrier 2 is in the open position P2B by utilizing the protrusion 2d of the barrier 2, the barrier detection switch 1c is made an on-state, and when the barrier 2 is achieved from the open position P2B to the semi open position P2C, the barrier detection switch 1c is an off-state.

Moreover, as shown in FIG. 16, in one of the sides of the aperture member 22 having a film opening portion also within the camera body 1, a cartridge chamber storing the film cartridge 25 is provided, and in the other side, the spool chamber storing the spool 26 is provided. The above mentioned film cartridge 25 is retained by pressing within the cartridge chamber via the pressure spring 29, and the film 27 which is rolled in the spool 26 is retained by the film retaining roller 30. Moreover, the electric circuit substrate unit for controlling camera 28 is provided and arranged in the front portion of the cartridge chamber of the aperture member 22.

In the front side of the rear cover 21, the pressure plate spring 24, the pressure plate 23 and the openings of the aperture member 22 are provided and arranged, the feeding path of the film 27 is provided between the aperture member 22 and the pressure plate 23.

Moreover, as shown in FIGS. 15 and 16, the gear 14 of the feed screw 13, which is a driving means, is engaged with the pinion 12 attached and fixed on an output axis of the driving motor 11 which partially accounts for the driving means. The feed screw 13 is fitted and spirally engaged with female screw portion 43c of the moving frame 43a of the lens barrel 43 described later and drives the lens barrel 43 to move forward and backward.

The portion of a camera of the present embodiment of the present invention especially different from that of a camera of the first embodiment of the present invention is the structure of the lens barrel 43 in which the lock axis 49 is incorporated, its different portion of the structure will be described bellow.

As shown in FIGS. 15 and 16, the above mentioned lens barrel 43 supports the zoom moving frame 43f and the above mentioned zoom moving frame 43f maintaining mainly the photographing lens 43g, and comprises the moving frame 43a which is capable of moving forward and backward from the storable position (collapsible position) to the photographing position (photographable position), the pressure plate 47 of a pressure member slidably supported by the moving frame 43a in an optical axis of the photographing lens, the lock axis 49 of the lock member similarly slidably supported by the moving frame 43a, the lock energizing spring (compression spring) 41 of the lock energizing member for energizing the lock axis 49 and the lock release spring (compression spring) 42 of the lock release energizing member, and the photographing lens position detection device 50.

The above mentioned moving frame 43a is slidably supported by the guide axis 15 which is fitted into the axis hole 43d, and supported in a manner of capable of being appeared or concealed manner against the opening portion 1j of the camera body 1. Its moving frame 43a is driven to move forward and backward by the rotation of the feed screw 13 which is fitted and spirally engaged into the female screw portion 43c partially accounting for as driving means parallel to the above mentioned guide axis 15 .

Moreover, the above mentioned moving frame 43a has the guide groove 43h provided along the optical axis O direction of the peripheral of its frame portion and the protrusion portion 43i provided in outer space of the guide groove 43h. The above mentioned protrusion portion 43i is provided with the axis hole 43j into which the lock axis 49 is slidably fitted.

The above mentioned pressure plate 47 is slidably fitted into the guide groove 43h of the above mentioned moving frame 43a, and has the rear end portion letter like protrusion portion 47a and the head portion stopper 47c in order to prevent the pressure plate 47 from being slide off from the guide groove 43h. Moreover, the above mentioned protrusion portion 47a is provided with the axis hole 47b into which the lock axis 49 is slidably fitted.

The above mentioned lock axis 49 is provided with snap ring groove into which the E type snap ring (hereinafter, referred to it as snap ring) 49c is fitted at the rear position at the predetermined distance from the head portion 49a, and provided with the flange portion 49b in its rear end. In order to incorporate this lock axis 49 into the moving frame 43a, first, the head portion 49a side is inserted and passed through the axis hole 47b from the rear, and after the lock release spring 42 is inserted, furthermore, inserted and passed through the axis hole 43j of the moving frame 43a. Moreover, the head portion stopper 47c of the pressure plate 47 is sequentially inserted into the holes 43k, 43l. And then, the lock energizing spring 41 is inserted, the snap ring 49c is fitted into the snap ring way, and assembled.

As described above, the lack axis 49 assembled on the moving frame 43a is incorporated in a state of its head portion 49a being fitted into the supporting hole 1i of the camera body 1 when the lens barrel 43 is mounted on the camera body 1. Then, the above mentioned lock energizing spring 41 is retained in a compressed state between the snap ring 49c and the protrusion portion 43i, and the lock release spring 42 is maintained in a compressed state between the protrusion portion 47a and the protrusion portion 43i.

When the lens barrel 43 shown in FIG. 21 described later is in a state of being drawn back to the storable position and the stopper 47c of the pressure plate 47 is in a state of being pressed as far as it is contacted with the moving frame 43a, suppose that the energizing force of the projecting direction (the direction contrary to the direction R) of the lock energizing 41 is smaller than that of dugout direction (the direction R) of the lock release spring 42. Therefore, in a state of the above mentioned lens barrel being stored, the lock axis 49 is drawn back to the inside of the camera body 1, and the head portion 49a of the lock axis 49 is located either in a position not projected from the supporting hole 1i of the camera body or in a positions lightly projected and not interfered with the notch 2c of the barrier 2 and the interior wall face 2e.

However, as shown in FIG. 16 and the FIGS. through 17 and 18 described later, when the lens barrel 43 is extended from the storable position and in a state of being projected from the opening 1j of the camera body 1, the energizing force of the lock release spring 42 does not act on the lock axis 49, the lock axis 49 is moved to the projecting direction by the energizing force of the projecting direction (the direction R) of the lock energizing spring 41. Then the snap ring 49c is pressed as far as it is contacted with the interior wall of the supporting hole 1i of the camera body 1, the head portion 49a is projected to the position at a predetermined distance measured from the supporting hole 1i of the camera body, the barrier 2 is made in a state of being locked in the notch portion 2c or in a state capable of being locked.

Moreover, as shown in the described later FIG. 20, while the lens barrel 43 being contracted into the storable position, even if the lock axis 49 is maintained in a projected position, the above mentioned lock release spring 42 has also the function of absorbing contracting stroke of the moving frame 43a compressed and deformed by the drawing back of the protrusion portion 43i of the moving frame 43a. By the absorbing motion of the above mentioned stroke, abnormal driving torque acting on the driving motor 11 is prevented.

Furthermore, although the head portion 49a of the above mentioned lock axis 49 in the above mentioned projected state, can be engaged with the notch portion 2c of the barrier 2, suppose that the sliding direction interval L between the notch portion 2c and the above head portion 49a when the barrier 2 is in the open position P2B is smaller than that of the slide direction clearance S between the head of the barrier 2 and peripheral side face of the moving frame 43a of the lens barrel 43 located in the photographing position. Thus, when the barrier is locked with the lock axis 49, the barrier 2 is not pressed as far as it will be contacted with the peripheral circular face of the moving frame 43.

The above mentioned photographing lens position detection device 50 comprises the position detection device substrate 51 supported on the side of the camera body 1, and two contact fragments 52a, 52b supported on the side of the lens barrel 43 of the photographing lens. When the lens barrel 43 is in the storable position, the above mentioned position detection device substrate 51 is provided with the electric conduction pattern 51a with which the contact fragment 52a is contacted, and when the lens barrel 43 is in the photographing position, it is provided with the electric conduction pattern 51b with which the contact fragment 52a is contacted and the common pattern 51c with which the contact fragment 52b is always contacted. It should be noted that the detecting signal made by this photographing lens position detection device 50 is capable of applying an output of zoom encoder.

The constitution of the lens barrel control section of a camera as the driving control means in the electric circuits of a camera of the present embodiment of the present invention and each detection switch section is similar to that of the camera of the above mentioned first embodiment of the present invention shown in the electric circuit of the above mentioned FIG. 13. It should be noted that the contact portion of the switch for detecting the storable position 34a in the electric circuit of FIG. 13 is constituted of the above mentioned contact fragment 52a and the electric conduction pattern 51a. Moreover, the contact portion of the photographing preparation position (photographing position) detection switch 34b is constituted of the above mentioned contact fragment 52a and the electric conduction pattern 51b.

Moreover, the photographing process control motion including the barrier opening and closing motions in a camera of the present embodiment of the present invention is also similar to that of the camera of the above mentioned first embodiment of the present invention, which is shown in the general flowchart of above mentioned FIG. 14.

Next, the motion of moving forward and backward of the lens barrel accompanied with the opening and closing of the barrier in a barrier-attached camera of the second embodiment of the present invention constituted as described above will be described bellow with reference to a cross sectional view in the photographing position of the barrier being open of the above mentioned FIG. 16, and FIGS. 17 through 21.

Figure 17:
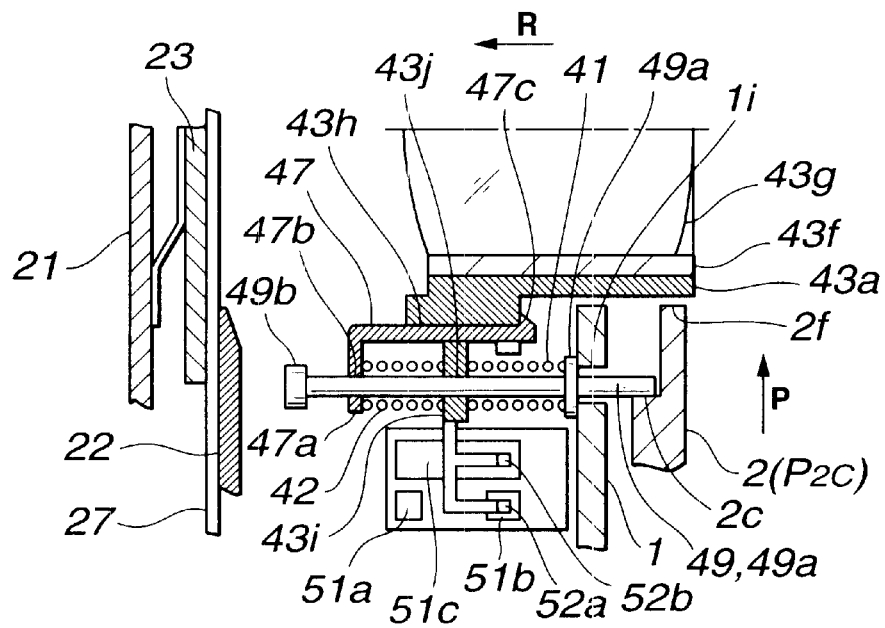
FIG. 17 is a cross sectional view of surroundings of a barrier and a lock axis when a barrier is in a state of having been moved to a semi open position and a lens barrel is in a photographing position in a barrier-attached camera of the above mentioned second embodiment of the present invention.
Figure 18:
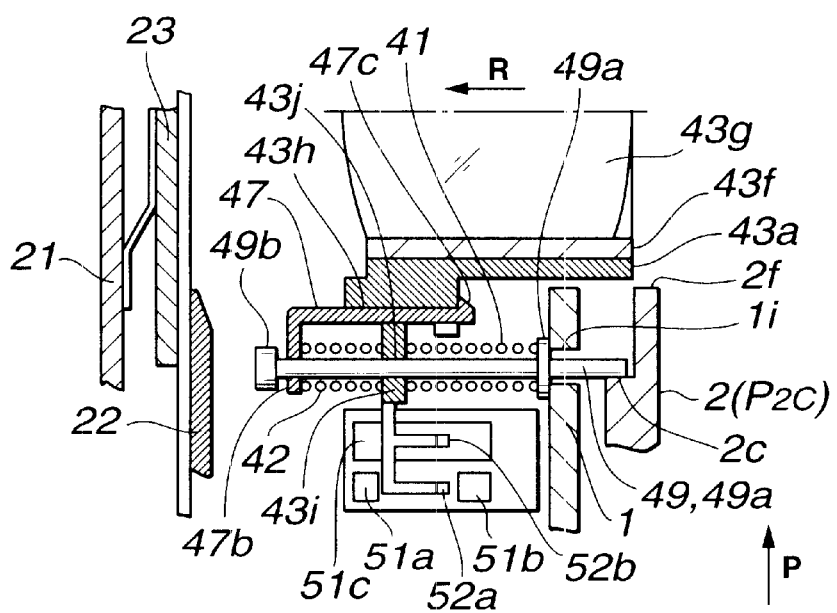
FIG. 18 is a cross sectional view of surroundings of a barrier and a lock axis when a barrier is in a semi open position and a lens barrel is in a state of initiating the contacting to a storage direction in a barrier-attached camera of the above mentioned second embodiment of the present invention.
Figure 19:
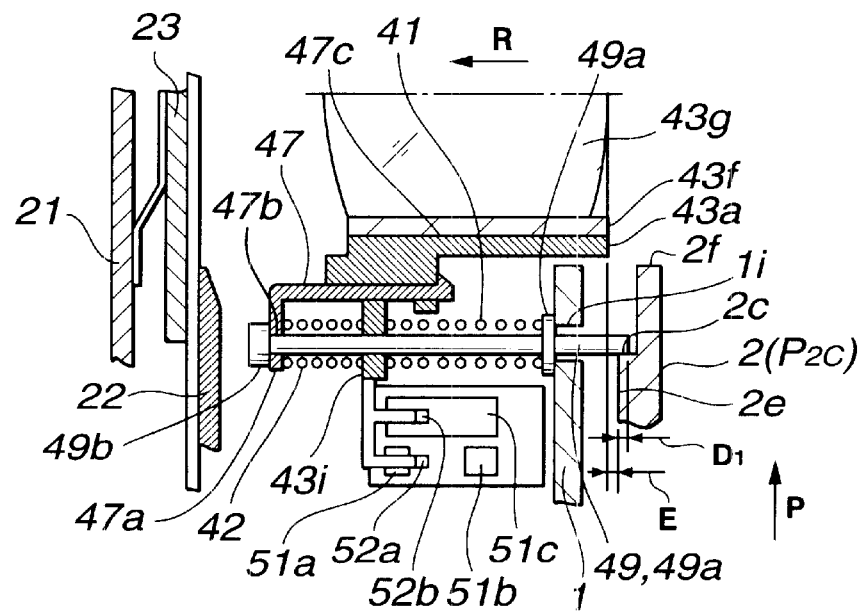
FIG. 19 is a cross sectional view of surroundings of a barrier and a lock axis when a barrier is in a semi open position and lens barrel is in a state of being contracted to a storage direction in a barrier-attached camera of the above mentioned second embodiment of the present invention.
Figure 20:
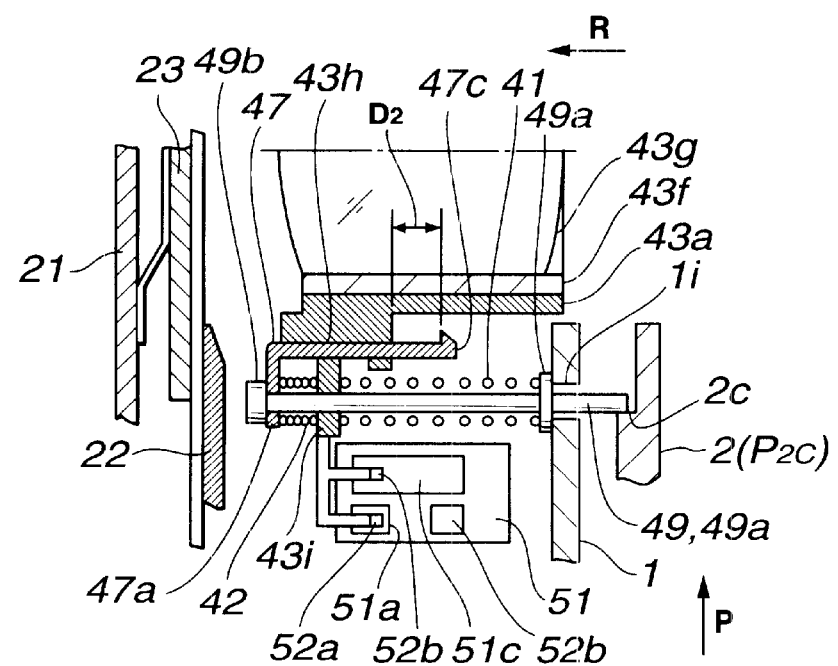
FIG. 20 is a cross sectional view of surroundings of a barrier and a lock axis when a barrier is in a semi open position and lens barrel is in a state of having arrived at a storable position in a barrier-attached camera of the above mentioned second embodiment of the present invention.
Figure 21:
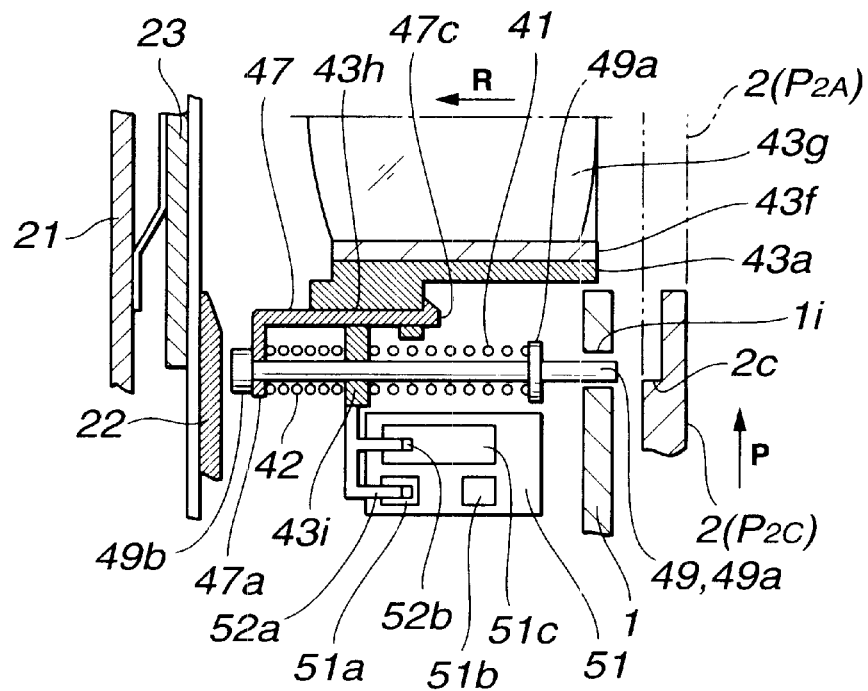
FIG. 21 is a cross sectional view of surroundings of a barrier and a lock axis when lens barrel is in a state of having been contracted at a storable position, and a barrier is in a semi open position and is in a state of pressing force to the closing direction being released in a barrier-attached camera of the above mentioned second embodiment of the present invention.

It should be noted that FIGS. 17 through 21 show partial cross sectional views of a camera of the present embodiment of the present invention, and are particularly, cross sectional views of the surroundings of the barrier and the lock axis in each motion state of the barrier and the lens barrel. FIG. 17 shows that the lens barrel is in the photographing position when the barrier is moved from the open position to the semi closed position. FIG. 18 shows that the lens barrel is started to be contracted from the photographing position into the storable position when the barrier is in the semi open position. FIG. 19 shows that the lens barrel is on the way of being contracted from the photographing position into the storable position also when the barrier is in the semi open position. FIG. 20 shows that the lens barrel is contracted into the storable position when the barrier is maintained in a state pressed to the direction P (the closing direction) in the semi open position. FIG. 21 shows that the lens barrel is contracted into the storable position when the pressure force of the direction P of the barrier is released.

When the lens barrel 43 shown in FIG. 16 is in the photographing position, the stopper 47c of the pressure plate 17 is pressed as far as it is contacted with the moving frame 43a, the flange portion 49b of the lock axis 49 is cleared from the protrusion portion 47a of the pressure plate 47, only the energizing force to the projecting direction of the lock energizing spring 41 acts on the lock axis 49. Therefore, the lock axis 49 is projected from the supporting hole 1i of the camera body, located in the position where it can be engaged with the notch 2c of the barrier 2, and maintains the state capable of being locked.

The barrier 2 is slightly slid from the open position P2B to the direction P in the state where the lens barrel 43 shown in the above mentioned FIG. 16 is in the photographing position, and when the barrier 2 is moved to the semi open position P2C shown in the FIGS. 17 and 18, the barrier detection switch 1c is released from the pressure force due to the protrusion 2d of the barrier by its slight movement, and its off signal is outputted to the CPU 32 (See FIG. 13). By its output, the motion of contracting to the storage direction (the direction R) of the lens barrel 43 is started.

At that time, the notch portion 2c of the barrier 2 is pressed as far as it is contacted with the head portion 49a of the lock axis 49, the barrier 2 is locked in the above mentioned semi open position P2C, and the movement to the direction P is restricted. Therefore, the head end face 2f of the barrier 2 is not pressed as far as it will be contacted with the peripheral of the lens barrel 43, and the lens-barrel 43 is protected. While the operational force to the closing direction is maintained for the barrier 2, since the pressure plate 47 is only slidably moved on the lock axis 49 integrally with the moving frame 43a while the lens barrel 43 is contracted into the direction R, excess load especially does not act on the driving motor 11.

Subsequently, the operational force to the closing direction is similarly maintained for the barrier 2, when the lens barrel 43 is contracted into the direction R of the storable position direction and the lens barrel 43 is achieved nearby the storable position as shown in FIG. 19, the protrusion portion 47a of the pressure plate 47 is pressed as far as it is contacted with the flange portion 49b of the lock axis 49. In this state, the stroke direction engagement distance D1 of the head portion 49a of the lock axis 49, which is capable of engaging with the notch 2c of the barrier 2, is secured. Moreover, at this time point, the difference distance E between the interior wall face 2e position of the barrier 2 and the front face position of the lens barrel 43 is larger than zero. That is to say, since the front face of the lens barrel 43 is located inside from the interior wall face 2e of the barrier 2, even if the barrier 2 is moved to the direction P, the lens barrel 43 and the barrier 2 are not interfered with each other.

While the above mentioned lens barrel 43 is contracted from the state where the flange portion 49b and the protrusion portion 47a of FIG. 19 are pressed into contact with each other, and achieved to the storable position as shown in FIG. 20, if the barrier 2 is pressed in the direction P and the operational force is maintained and the lock axis 49 is maintained in the projected position, the lock energizing spring 41 is extended (however it is compressed with respect to the free length.), the stopper 47c of the pressure plate 47 is moved apart from the moving frame 43a, and the lock release spring 42 develops the deflection to the compression direction. By the lock release spring 42 being thus compressed, the lens barrel 43 can be smoothly contracted into the storable position without forcibly moving the lock axis 49 to the direction R, which is retained by the above mentioned friction retention force.

Then, the energizing force acting on the lock axis 49 to the projected direction, which is added by the above mentioned spring 41 is gradually decreased, and to the contrary, the lock axis 49 is energized to the direction R. At that time, if the operational force to the closing direction of the barrier 2 is removed, once the pressure force to the direction P of the barrier 2 is released, the lock axis 49 is moved backward from the projected position in the locked state to the direction R by the spring 42, and the locked state of the barrier is released. Subsequently, even if the barrier 2 is slid to the direction P, since the difference distance E is larger than zero as described above, the barrier 2 and the lens barrel 43 are interfered with each other.

Then, when the lens barrel shown in FIG. 20 is achieved to the storable position, the energizing force itself added by the above mentioned spring 41 and 42 acting on the above mentioned lock axis 49 is surely an energizing force to draw the lock axis 49 to the storable position direction. However, if the barrier 2 is pressed to the direction P, the friction retention force orthogonal to the lock axis 49 acts on the lock axis 49 by the notch portion 2c of the barrier 2 and the lock axis 49 being pressed as far as contacted with each other, and the lens barrel is maintained in the projected position.

Then, once the operational force to the direction P of the barrier 2 is released, the retention force by friction of the lock axis 49 is also released, the energizing force of the storable position direction (the direction R) of the lock release spring 42 being larger than that of the lock energizing spring 41 acts on the lock axis 49. The lock axis 49 is moved backward from the projected position to the dugout position not projected from the camera body 1, as shown in FIG. 21. The pressure plate 47 is moved to the position where its stopper 47c is pressed as far as it is contacted with the moving frame 43a by its flange portion 47b being pressed and driven to the direction R due to the energizing force of the lock release spring 42. Since in this state, the barrier 2 is released from the locked state of the lock axis 49, it can be slid to the direction P and moved to the closed position P2A.

It should be noted that the distance D2 between the above mentioned stopper 47c which, in FIG. 20, is the stroke the pressure plate 47 moved relatively from the state where the stopper 47c of the pressure plate 47 was pressed as far as it was contacted with the moving frame 43a as shown in FIG. 19a and the moving frame 43a is larger than the above mentioned stroke direction engagement distance D1 (See FIG. 19) within the notch portion 2c of the barrier 2 of the head portion 49a in the projected state of the lock axis 49. That is to say, in the case where the lock axis 49 is moved backward to the direction R and released from the locked state, it is set up so that the head portion 49a of the lock axis 49 does not interfere with the interior wall face 2e of the barrier 2.

In order that the above mentioned barrier 2 is opened and the lens barrel 43 is made a photographing state again, the barrier is operated to be slid to the direction Q located in the closed position P2A. When the barrier 2 passes over the semi open position P2C, and achieves to the open position P2B as shown in FIG. 16, the barrier detection switch 1c is switched to an on-state. The CPU 32 (See FIG. 13) controls the driving motor 11 based on the on signal, and the lens barrel 43 is extended into the photographing position. Since in this state, the lock energizing spring 41 is compressed by the predetermined amount by means of the protrusion portion 43i of the moving frame 43a, the lock axis 49 is moved again to the projected position where the barrier can be locked and the head portion 49a of the lock axis 49 is projecting from the camera body 1.

According to the above mentioned barrier-attached camera of the second embodiment of the present invention, similar to the above mentioned barrier-attached camera of the first embodiment of the present invention, while the lens barrel 43 is contracted into the storable position, the above mentioned barrier 2 is locked by the lock axis 49 located in the projected position, and interference by striking and contacting with the lens barrel 43 is prevented. Then, in the state where the lock axis 49 is pressed to the direction P by the barrier 2, the lock axis 49 is not moved backward, but the lock release spring 42 is pressed to gradually develop the deflection by the protrusion portion 43i of the moving frame 43a. Therefore, when the lens barrel 43 is contracted, since only slight load is increased by the deflection of the above mentioned lock release spring 42, abnormal excessive load driving state is not produced, and the significant power consumption can be avoided in the driving motor.

Especially, in the case of a barrier-attached camera of the second embodiment of the present invention, since the all the constituting members such as a spring retaining the lock axis 49 are incorporated in the lens barrel 43, the assembling and adjusting of the surroundings of the lock axis of the lens barrel 43 can be easily carried out even if it is in a unit, the surroundings of the lens barrel 43 can be compactly integrated.

According to a barrier-attached camera of the present invention as described, in a camera having a barrier movable to the open position at which the photographing lens is exposed and to the closed position at which the photographing lens is closed, while the lens barrel is contracted into the storable position, even if the barrier is operationally pressed to the closing direction, the barrier is locked, the barrier is not pushed on as far as it will be contacted with the above mentioned lens barrel, and excessive load does not act on the driving means of the photographing lens.

What is claimed is:

1. A camera comprising:
    a camera body;
    a lens barrel of a photographing lens retaining said photographing lens and capable of moving said photographing lens in a direction of optical axis against said camera body;
    a barrier capable of moving to an open position at which said photographing lens located in photographing position is exposed and to a closed position at which said photographing lens located in a storable position is covered;
    a lock member capable of moving in a direction of optical axis of said photographing lens and locking a movement of said barrier by engaging with said barrier so that said lens barrel is not contacted with said lens barrier;
    a lock energizing member energizing said lock member to a direction of said barrier being locked; and
    a lock release energizing member provided on said lens barrel of a photographing lens and being moved together with said lens barrel of a photographing lens, while said lens barrel of a photographing lens is moved to said storable position, pressing said lock member to a direction of said storable position.

2. A camera in claim 1, wherein said lock member engages with said barrier and prohibits a movement of said barrier toward said closed position, and wherein while an operational force to said barrier toward said closed position continues, and after said photographing lens moves to a storage completion position, the engagement between said lock member and said barrier continues and prohibits the movement of the barrier toward said closed position.

3. A camera in claim 2, in which said lock release energizing member makes said lock member possible to move relatively with said lens barrel of a photographing lens while said barrier engages with said lock member and said barrier prevents said lock member from moving along optical axis.

4. A camera in claim 1, in which said lock member is a bar-like member and arranged parallel to optical axis of said photographing lens.

5. A lock member in claim 1, in which said lock member is provided on said camera body.

6. A lock member in claim 1, in which said lock member is provided on said lens barrel of a photographing lens.

7. A lock release energizing member in claim 1, in which said lock release energizing member absorbs a relative movement difference between an amount of movement of said lens barrel of a photographing lens and an amount of movement of said lock member.

8. A camera in claim 1, further comprising a pressure member provided between said lock release energizing member and said lock member and movable relative to said lens barrel.

9. A pressure member in claim 8, in which said pressure member is provided movable relative to said lens barrel.

10. A lock release energizing member in claim 1, in which an energizing force of said lock release energizing member is larger than an energizing force of said lock energizing member.

11. A camera comprising:

a camera body;

a photographing lens capable of moving to a photographing position and to a storable position against said camera body;

a driving means moving said photographing lens to said photographing position and to the storable position;

a barrier capable of moving to an open position at which said photographing lens in said photographing position is exposed and to a closed position at which said photographing lens in said storable position is covered, having a movement trace within which said photographing lens in said photographing position is located, and said photographing lens in said storable position is located out of the movement trace of the barrier;

a lock member engaging with said barrier and locking while said photographing lens is present in said movement trace of said barrier and while said driving means drives said photographing lens so that said barrier does not hit said photographing lens;

a lock energizing member energizing said lock member to a direction of said barrier being locked; and a lock release energizing member provided on said photographing lens and pressing said lock member to a direction of said storable position while said photographing lens is moved to said storable position.

12. A camera in claim 11, wherein said lock member engages with said barrier, prohibits movement of said barrier to a closing direction, if an operational force against said barrier to a closing direction continues, continues to engage with and stop said barrier, and it continues to prohibit movement of said barrier even if said photographing lens achieves to storage completion position.

13. A camera in claim 12, in which said lock release energizing member makes said lock member possible to move relatively with said lens barrel of a photographing lens while said barrier engages with said lock member and said barrier prevents said lock member from moving along optical axis.

14. A camera in claim 11, in which said lock member is a bar-like member and arranged parallel to optical axis of said photographing lens.

15. A lock member in claim 11, in which said lock member is provided on said camera body.

16. A lock member in claim 11, in which said lock member is provided on a lens barrel of a photographing lens.

17. A lock release energizing member in claim 11, in which said lock release energizing member absorbs a relative movement difference between an amount of movement of said lens barrel of a photographing lens and an amount of movement of said lock member.

18. A barrier-attached camera in claim 11, further comprising: a pressure member provided movable relative to said lens barrel between said lock release energizing member and said lock member.

19. A lock release energizing member in claim 11, in which an energizing force of said lock release energizing member is larger than an energizing force of said lock energizing member.

20. A camera comprising:

a camera body;

a lens barrel of a photographing lens retaining a photographing lens and capable of moving said photographing lens along optical axis direction relative to said camera body;

a barrier capable of moving to an open position at which said photographing lens located in a photographing position is exposed and to a closed position at said photographing lens located in a storable position is covered;

a lock member capable of moving in a direction of optical axis of said photographing lens and engaging with said barrier, and locking movement of said barrier so that said lens barrel does not press said photographing lens;

a lock energizing member energizing said lock member in a direction of said barrier being locked; and a lock release energizing member provided on said lens barrel of a photographing lens, capable of moving together with said lens barrel of a photographing lens, and absorbing relative movement difference between an amount of movement of said lens barrel of a photographing lens and an amount of movement of said lock member while movement of said lock member is prevented by said barrier and while said lens barrel of a photographing lens is moved to said storable position.

* * * * *

UNITED STATES PATENT AND TRADEMARK OFFICE
CERTIFICATE OF CORRECTION

Figure 22:
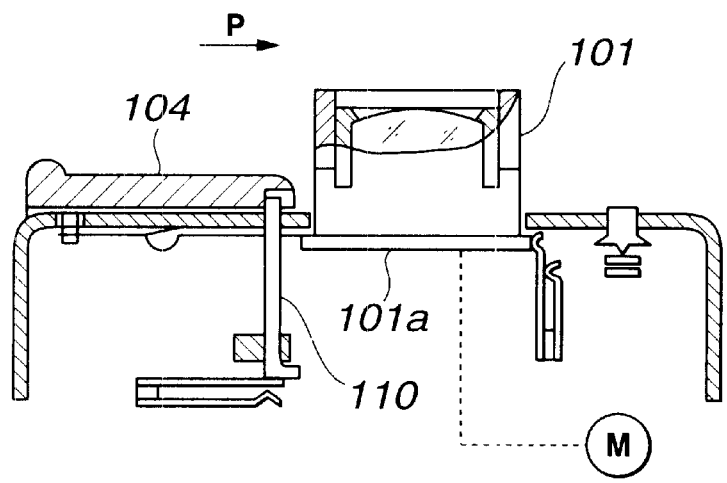
FIG. 22 is a cross sectional view of a major section of surroundings of a lens barrel in a barrier locked state of conventional barrier-attached camera.
Figure 17:
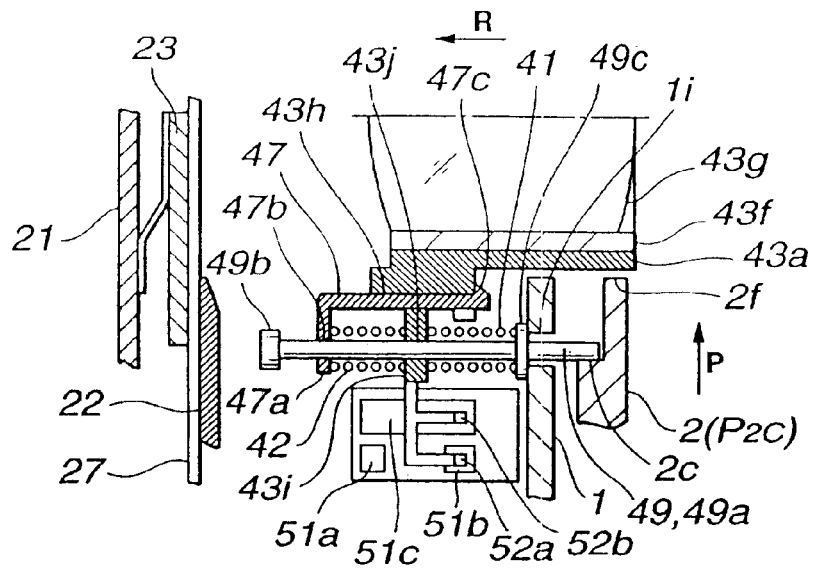
Figure 18:
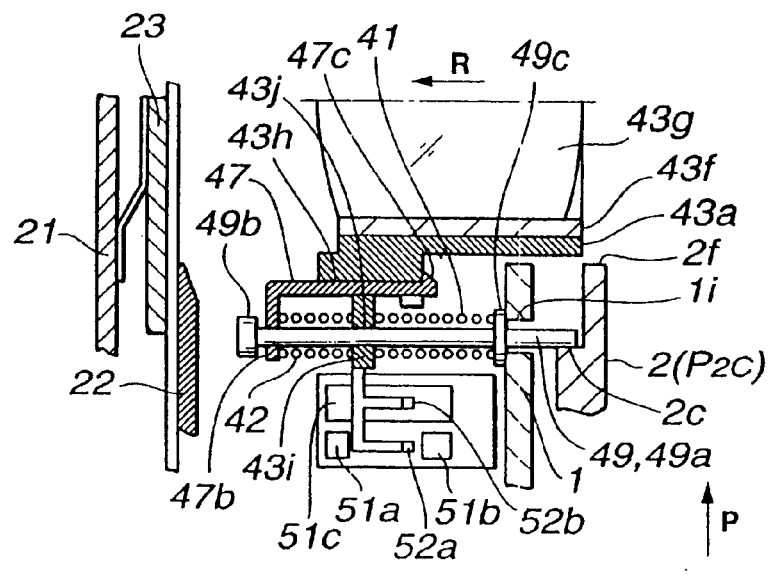
Figure 19:
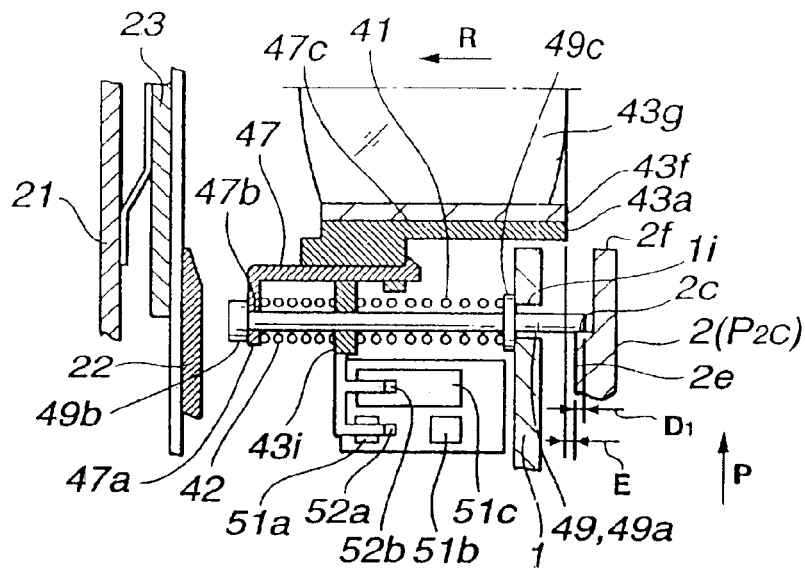
Figure 20:
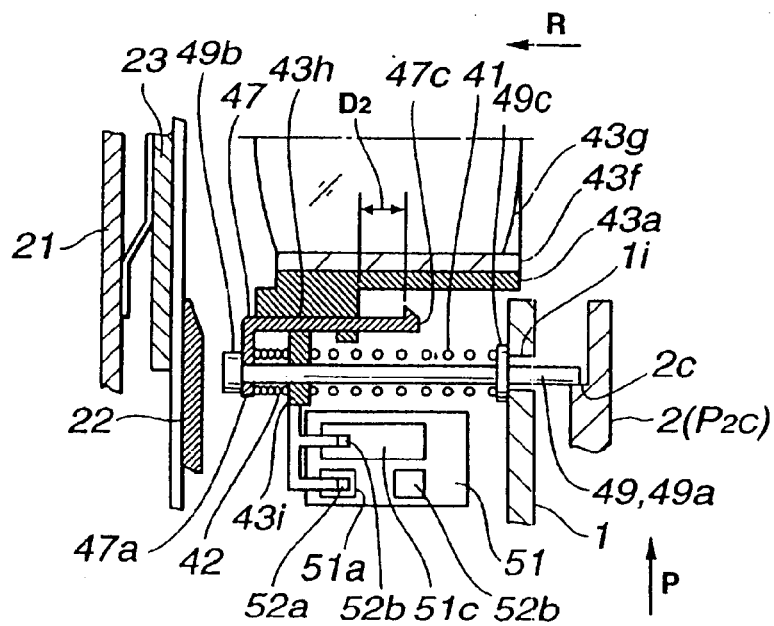
Figure 21:
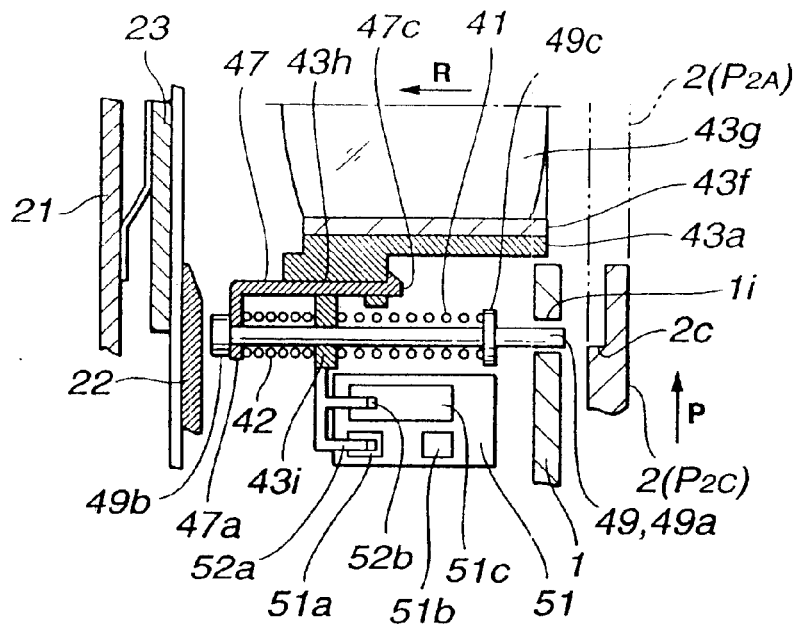
Figure 22:
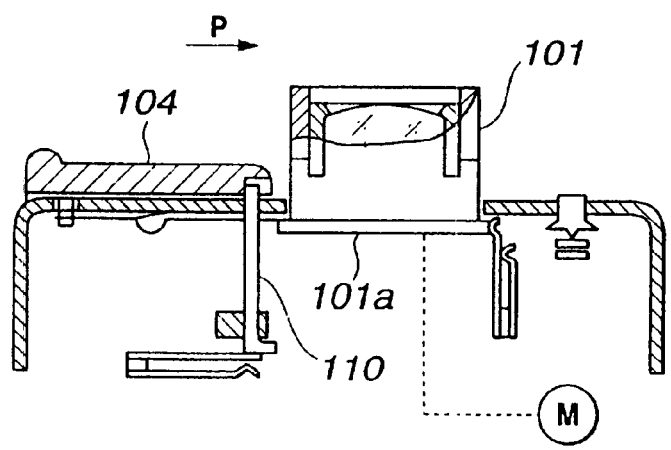

PATENT NO. : 6,450,708 B1
DATED : September 17, 2002
INVENTOR(S) : Tatsuo Takanashi It is certified that error appears in the above-identified patent and that said Letters Patent is hereby corrected as shown below:

Drawings,
Sheet 11 of 13, consisting of Figures 17 and 18, should be replaced with the corrected Figures 17 and 18, as shown on the attached pages.
Sheet 12 of 13, consisting of Figures 19 and 20, should be replaced with the corrected Figures 19 and 20, as shown on the attached pages.
Sheet 13 of 13, consisting of Figures 21 and 22, should be replaced with the corrected Figures 21 and 22, as shown on the attached pages.

Column 11,
Line 65, change "the lack axis" to -- the lock axis --.

Signed and Sealed this

Twenty-ninth Day of November, 2005

JON W. DUDAS
*Director of the United States Patent and Trademark Office*